United States Patent
Anderson, Jr. et al.

(10) Patent No.: US 7,344,277 B2
(45) Date of Patent: Mar. 18, 2008

(54) AMBIANCE LIGHTING SYSTEM WITH TEMPERATURE RESPONSIVE VARIABLE COLOR OUTPUT

(75) Inventors: James Burr Anderson, Jr., Cookeville, TN (US); William Colie Smith, McMinnville, TN (US)

(73) Assignee: Federal-Mogul WorldWide, Inc., Southfield, MI (US)

( * ) Notice: Subject to any disclaimer, the term of this patent is extended or adjusted under 35 U.S.C. 154(b) by 113 days.

(21) Appl. No.: 11/214,195

(22) Filed: Aug. 29, 2005

(65) Prior Publication Data

US 2007/0046452 A1    Mar. 1, 2007

(51) Int. Cl.
*F21V 23/04* (2006.01)
*B60Q 3/02* (2006.01)
*B60Q 3/04* (2006.01)

(52) U.S. Cl. .................. 362/276; 362/96; 362/231; 362/294; 362/373; 362/488; 362/489; 362/547; 236/49.3; 236/94; 340/461; 340/815.4

(58) Field of Classification Search ............... 362/494, 362/464, 96, 231, 276, 294, 373, 488, 489, 362/547; 236/49.3, 94; 340/815.4, 691.1, 340/691.6, 461
See application file for complete search history.

(56) References Cited

U.S. PATENT DOCUMENTS

| | | | | |
|---|---|---|---|---|
| 4,167,967 A | * | 9/1979 | Kumagai | 165/11.1 |
| 4,170,259 A | * | 10/1979 | Kumagai et al. | 165/11.1 |
| 4,191,242 A | * | 3/1980 | Kumagai | 165/11.1 |
| 4,271,897 A | * | 6/1981 | Tatemoto | 165/11.1 |
| 4,443,097 A | * | 4/1984 | Nagasawa et al. | 355/68 |
| 4,962,302 A | * | 10/1990 | Katsumi | 236/13 |
| 5,259,553 A | * | 11/1993 | Shyu | 236/49.3 |
| 5,477,436 A | | 12/1995 | Bertling et al. | 362/231 |
| 5,619,182 A | | 4/1997 | Robb | 340/479 |
| 5,647,657 A | | 7/1997 | Damasky et al. | 362/32 |
| 5,844,479 A | | 12/1998 | Walton | 340/479 |
| 6,164,792 A | | 12/2000 | Nakagome | 362/86 |
| 6,536,928 B1 | * | 3/2003 | Hein et al. | 362/464 |
| 2003/0142504 A1 | * | 7/2003 | Mueller et al. | 362/488 |
| 2005/0225993 A1 | * | 10/2005 | Yamazaki et al. | 362/488 |
| 2006/0044800 A1 | * | 3/2006 | Reime | 362/276 |

* cited by examiner

*Primary Examiner*—Alan Cariaso
*Assistant Examiner*—Kevin J. Spinella
(74) *Attorney, Agent, or Firm*—Robert L. Stearns; Dickinson Wright PLLC

(57) ABSTRACT

An ambiance lighting system for a vehicular passenger compartment has a variable color light output which is automatically responsive to temperature changes. First and second light sources of different colors (e.g., blue and red) are positioned immediately behind the air discharge vents and are selectively energized by a control circuit so that the first light source radiates light through the vent when the temperature falls below a predetermined value and the second light sources energizes the second color of light when the air temperature rises above a predetermined value. Sensors are used to detect the temperature of air, preferably in the ducting plenum. Various control strategies can be deployed to achieve aesthetically interesting light presentations which enhance ambiance within the passenger compartment.

10 Claims, 3 Drawing Sheets

AMBIANCE LIGHTING SYSTEM WITH TEMPERATURE RESPONSIVE VARIABLE COLOR OUTPUT

BACKGROUND OF THE INVENTION

1. Field of the Invention

The invention relates to an ambiance lighting system for a vehicular passenger compartment, and more particularly toward a lighting system having a variable color light output responsive to temperature changes within the passenger compartment.

2. Related Art

In vehicular applications, and particularly those pertaining to passenger automobiles, every effort is made to enhance the comfort, convenience and ambiance within the passenger compartment. New vehicles are more likely to attract buyer attention with enhanced features and a pleasing ambiance. One technique used to affect ambiance within the passenger compartment involves techniques which affect lighting. A well-executed lighting system can have a positive aesthetic impact on people within the passenger compartment.

Accordingly, any device or technique which is aesthetically pleasing and affects the lighting ambiance within a passenger compartment will be readily accepted within the industry.

SUMMARY OF THE INVENTION AND ADVANTAGES

The subject invention comprises an ambiance lighting system for a vehicular passenger compartment having a variable color light output responsive to temperature changes within the passenger compartment. The system comprises an air discharge vent within the passenger compartment. A detector senses the temperature of air delivered to the vent. A lighting device projects light within the passenger compartment. And a control circuit, which is responsive to the detector, energizes the lighting device to project a first color of light when the air temperature is below a predetermined value and to project a second color of light when the air is above a predetermined value. The first and second colors of projected light are different and the ambiance within the passenger compartment is enhanced by the selective changing of colors in response to the sensed temperature of air delivered to the vent.

According to another aspect of the invention, an ambiance lighting system for a vehicular passenger compartment has a variable color light output responsive to temperature changes within the passenger compartment. The system comprises a plenum for conducting air, an air discharge vent operatively connected to the plenum for directing air from the plenum into the passenger compartment, a detector for sensing the temperature of air in the plenum, a lighting device disposed within the plenum adjacent the vent for projecting light through the vent into the passenger compartment, and a control circuit responsive to the detector for energizing the lighting device to project a first color of light when the air temperature is below a predetermined value and for energizing the lighting device to project a second color of light when the air is above a predetermined value. Again, the first and second colors are different and the ambiance within the passenger compartment is enhanced by the automatic changing of colors in response to the sensed temperature of air delivered to the vent.

According to yet another aspect of the invention, a method for ambiance lighting a passenger compartment in a motor vehicle in response to temperature changes within the passenger compartment is provided. The method comprises the steps of discharging air through a vent within the passenger compartment, sensing the temperature of the air, and projecting a first color of light within the passenger compartment when the sensed air temperature is below a predetermined value and projecting a second color of light within the passenger compartment when the sensed air temperature rises above a predetermined value. As before, the first and second colors are different and the ambiance within the passenger compartment is enhanced by the automatic changing of colors in response to the sensed temperature of air within the passenger compartment.

Among these various aspects of the invention, a unique and aesthetically pleasing presentation of light within the passenger compartment is manifested. The first and second colors of projected light can be selected amongst any in the visible spectrum. For example, the second color may be in the red color family and the first color may be in the blue color family. In this manner, an occupant would see the color red when the temperature of the air is high, and see the color blue when the air temperature is low.

BRIEF DESCRIPTION OF THE DRAWINGS

Other advantages of the present invention will be readily appreciated as the same becomes better understood by reference to the following detailed description when considered in connection with the accompanying drawings, wherein.

DETAILED DESCRIPTION OF THE PREFERRED EMBODIMENT

Figure 1:
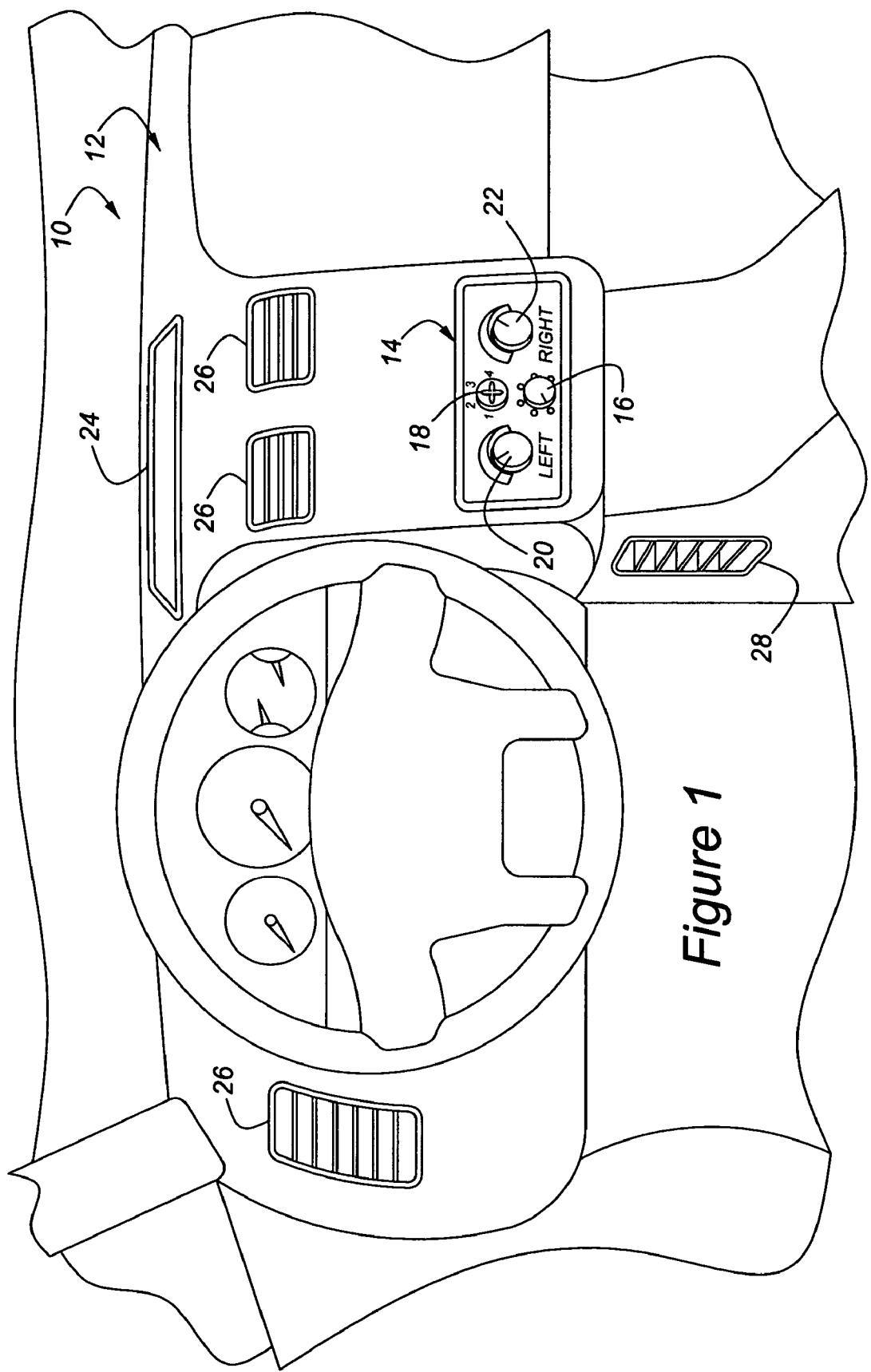
FIG. 1 is an exemplary view of an interior passenger compartment in a motor vehicle in which numerous air vents are provided.

Referring to the Figures, wherein like numerals indicate like or corresponding parts throughout several views, the passenger compartment in all exemplary motor vehicle is generally shown at 10. The passenger compartment 10 includes a dashboard, generally indicated at 12, into which a typical climate control system, generally indicated at 14, may be mounted. Although the climate control system 14 will vary from one vehicle make and model to the next, there is generally provided a mode selector 16 from which the type of air treatment and discharge location can be controlled, a fan speed control selector 18, and one or more temperature control selectors 20. In the example illustrated in FIG. 1, a second temperature control selector 22 may be provided for independently controlling the temperature of air discharged from the right, or passenger, side of the vehicle; whereas the temperature control selector 20 would be used to control air discharged from the driver's side of the vehicle.

Figure 2:
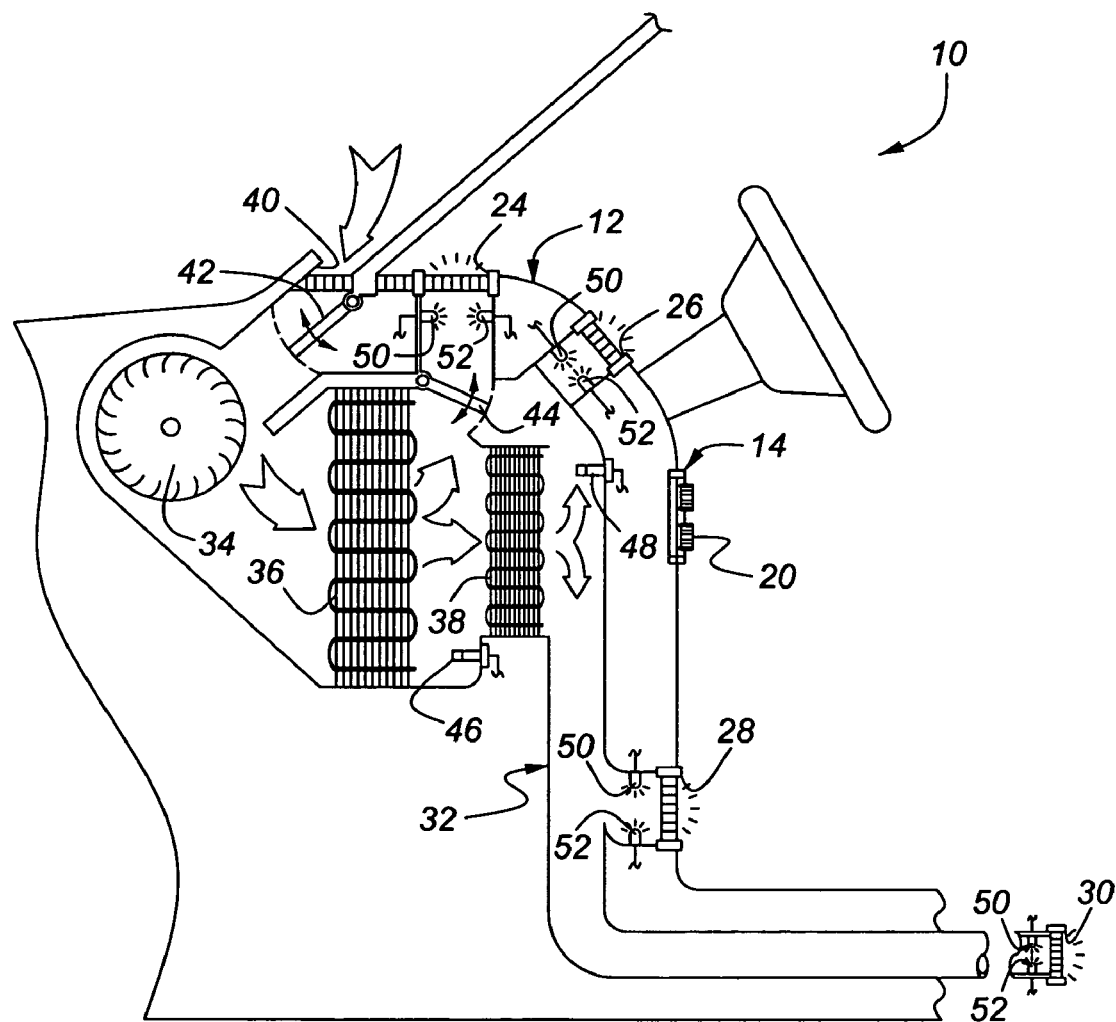
FIG. 2 is a schematic illustrating an exemplary heating, ventilation, and air conditioning system within a motor vehicle through which air traveling a plenum network are delivered to various discharge vents within a passenger compartment.

As is typical with most motor vehicles, the heating ventilation and air conditioning (HVAC) system includes multiple air discharge vents within the passenger compartment. In the example of FIG. 1, the air discharge vents include a front defroster vent 24, an array of dashboard mounted vents 26, and a floor vent 28. In FIG. 2, these various vents are shown schematically together with a rear vent 30 which discharges toward the rear of the passenger compartment 10. These various vents communicate with a common plenum, generally indicated at 32, which is part of the overall HVAC air handling system. Other components in the HVAC system may include a blower 34, an evaporator 36, a heater core 38, a fresh air inlet 40, a re-circulated air valve 42 and an A/C bypass valve 44. Of course, these various components can be found in other arrangements and configurations, and are presented in FIG. 2 merely for illustrative purposes.

A detector, shown here in the form of independent first 46 and second 48 sensors, is provided for sensing the temperature of air delivered to each of the vents 24-30. The first sensor 46 is configured to determine when the air temperature falls below a predetermined value, and therefore it may be optimally located near the evaporator 36. Conversely, the second sensor is configured to sense when the temperature of air rises above a predetermined value, such that its location may be optimally positioned on the down stream side of the heater core 38. While the sensors 46, 48 are shown and described as being located within the plenum 32, they can alternatively be located outside of the air handling system in any other convenient or advantageous location.

Figure 3:
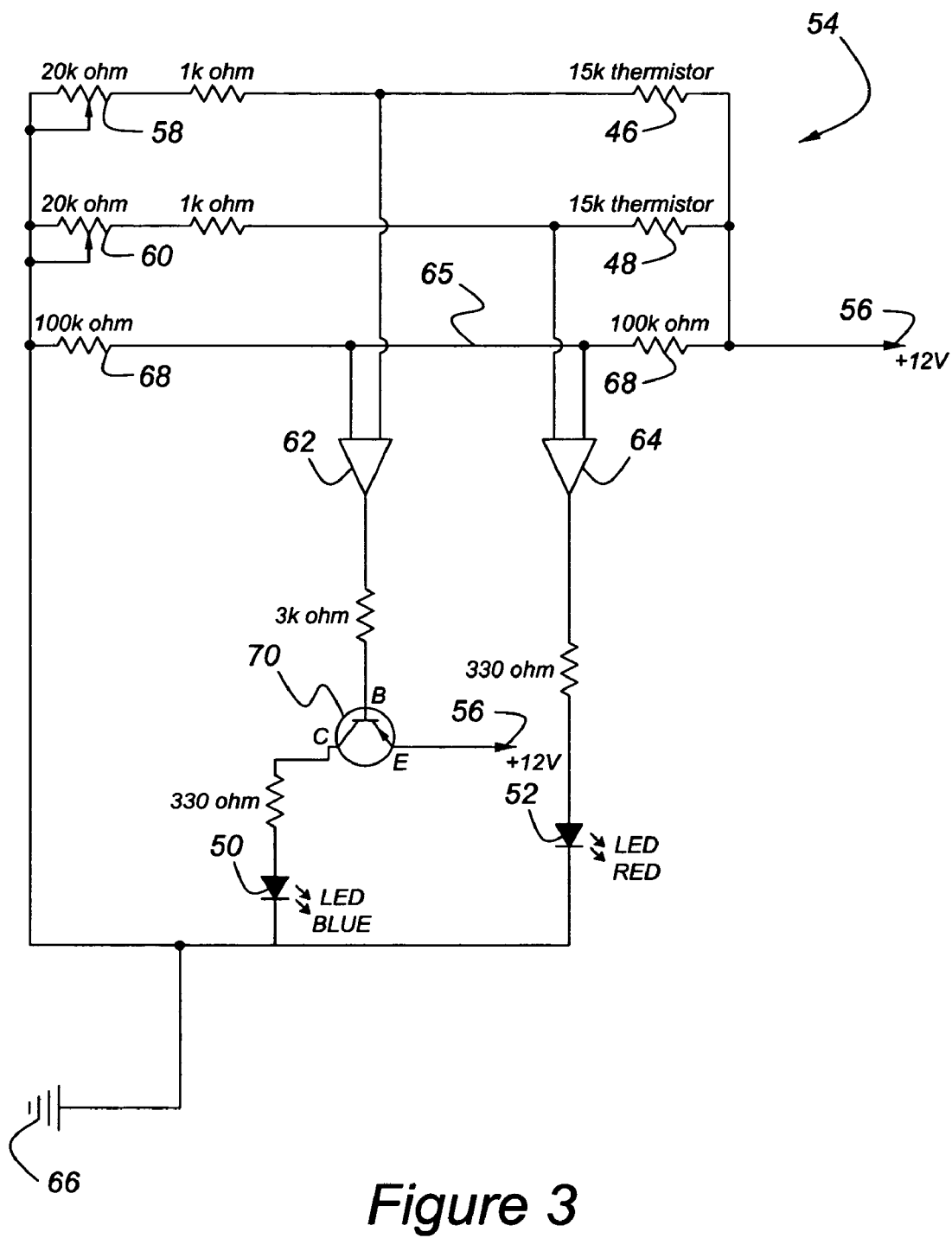
FIG. 3 is a simplified circuit diagram illustrating an exemplary embodiment of the subject control circuit.

A lighting device projects light within the passenger compartment in such a manner so as to change the color of emitted light in response to the sensed temperature of air. The lighting device can be located anywhere within the passenger compartment 10, or even outside the passenger compartment 10 provided its light is visible to occupants within the passenger compartment 10. The lighting device may comprise a single light source capable of emitting two or more colors of light. Such lighting devices can be of any type of light producing device, including incandescent, fluorescent, light emitting diode, or otherwise. Those of the LED type are sometimes referred to bi-color or tri-color LED's. In the preferred embodiment, however, the lighting device includes a first mono-color light source 50 and a separate, second mono-color light source 52. A control circuit, generally shown at 54 in FIG. 3, is responsive to the first 46 and second 48 sensors for automatically energizing the light sources 50, 52 to project a first color of light from the first light source 50 when the air temperature is below a predetermined value and for energizing the second light source 52 to project a second color of light when the air temperature is above a predetermined value. The first and second colors of light are different from one another and have the affect of enhancing the ambiance and visual aesthetics within the passenger compartment. The first light source 50 can be any color at all, however, since it is visible only when the air temperature falls below a predetermine value, its color might be selected from those from within the families of "cool" colors having lower wave lengths. For example, the first light color may have a predominant wave length below 5,500 angstroms. The second color may have a predominant wave length above 5,500 angstroms and be within the family of colors perceived as "warm." Although the first 50 and second 52 light sources can be of any type of light producing device, including incandescent, fluorescent, or otherwise, these devices may comprise light emitting diodes (LEDs) with the first light source 50 having a predominantly blue color and the second light source 52 having a predominantly red color. Again, these color choices are subjective and can be varied to achieve any desired lighting effect.

Referring again to FIG. 2, the first 50 and second 52 light sources are shown disposed within the plenum 32 immediately up stream of each of the vents 24, 26, 28, and 30. In this configuration, occupants within the passenger compartment are shielded from a direct view of the light sources 50, 52, however, their projected light fills the plenum and radiates from each of the vents 24-30 to create a particularly interesting so-called "back light," effect. Instead of individual LEDs for each of the light sources, a single light source can be used for each of the first and second colors, with optical wave guides routed to pipe the light to the various locations. Again, this indirect back lighting technique, while a preferred application of the invention, is by no means the only implementation option. Alternatives include effects to illuminate the vents per se and/or their escutcheon features. The selector knobs 16-22 and/or features associated with the selectors can be illuminated by the control circuit 54. Or, illuminated features within the passenger compartment 10 wholly segregated from the HVAC and climate control system are within the scope of the invention.

In FIG. 3, the control circuit 54 is shown with the first and second light sources 50, 52 comprising light emitting diodes and the first 46 and second 48 sensors comprising thermistors. The sensors 46, 48 may be of a functional type other than a thermistor. A power source 56 draws voltage from the vehicular electrical system. In most vehicles in current use, the power source 56 comprises 12 volts, however, other system voltages and polarities may be used with only minimal modifications required.

Electricity from the power source 56 is directed to the first 46 and second 48 sensors, respectively, which, being of the thermistor type, have a high negative temperature co-efficient of resistance so that their resistance decreases as the temperature increases. Adjustable resistors 58, 60 are useful to tune the respective sensors 46, 48 so that an appropriate voltage and/or current is supplied to the respective positive legs of differential amplifiers 62, 64. The negative legs of the first 62 and second 64 differential amplifiers are connected to line 65 which extends between electrical ground 66 and the power source 56 through resistors 68.

When the difference between the voltages applied between the two input legs to the second differential amplifier 64 are sufficient, the second light source 52 is energized and projects light (e.g., red) within the passenger compartment 10. This happens automatically when the temperature rises above a predetermined value, thus lowering the resistivity within the second sensor 48 and allowing a high enough voltage to enter the positive leg of the second differential amplifier 64.

The wiring configuration for the first light source 50 is similar to that of the second light source 52. However, in order to reverse its functionality a PNP transistor 70 is wired between the first differential amplifier 62 and the first light source 50, with a lead to the power source 56. A reverse logic is achieved. In other words, the transistor 70 functions as a "digital not" and accomplishes the reversal of the methodology exhibited in the circuitry leading to the second light source 52. Thus, as the temperature rises above the predetermined value and the first sensor 46 allows increase voltage and current to enter the first differential amplifier 62, the transistor 70 operates as an "open" switch. However, when the temperature falls below the predetermined value so that the first sensor 46 curtails the flow of current to the first differential amplifier 62, the transistor 70 acts as a "closed"

switch allowing the electricity from the power source 56 to energize the first light source 50.

Depending upon how each of the sensors 46, 48 are tuned by the respective adjustable resistors 58, 60, the predetermined temperature value can be different for each of the first 50 and second 52 light sources. If the predetermined temperature values are exactly the same, the first light source 50 will be de-energized the moment the second light source 52 is energized. However, if different temperature values are used to tune the sensors 46, 48, various scenarios can result, with a mid-temperature range over which both light sources 50, 52 are energized or else neither light source 50, 52 is energized. Additionally, the control circuit 54 can be wired into the climate control system 14 so that the power source 56 is only active when both the fan control selector 18 and the mode selector 16 are in conditions calling for active operation of the HVAC system. In this latter scenario, the first 50 and second 52 light sources would be incapable of operating if either the mode selector 16 is in an inoperative position or if the fan control selector 18 is in the off position.

In a variation of the embodiments described, a separate control circuit 54 can be used for the passenger side of the vehicle if separate temperature controls 20, 22 are provided for the driver and passenger sides of the vehicle. In this condition, the passenger may choose a relatively hot setting in which case all of the vents associated with the right side of the passenger compartment 10 will be illuminated by the second light source 52, and the driver may choose a relatively low temperature setting in which case all of the vents associated with the left side of the passenger compartment 10 are illuminated by the first light source 50. Thus, an entire secondary lighting device is independently operatively controlled by the control circuit 54, or by a parallel control circuit. According to another variation of the invention, the respective vents, 24-30 can be selectively and independently illuminated by their associated light sources 50, 52 based upon the condition of the mode selector 16. Thus, if mode selector 16 is set to floor vent condition only, then light sources 50, 52 associated directly with the floor vent 28 will be energized yet all other light sources associated with the defroster 24 and dash 26 vents will be dormant, and so forth.

The invention has been described in an illustrative manner, and it is to be understood that the terminology which has been used is intended to be in the nature of words of description rather than of limitation. Obviously, many modifications and variations of the present invention are possible in light of the above teachings. It is, therefore, to be understood that within the scope of the appended claims, the invention may be practiced otherwise than as specifically described. The invention is defined by the claims.

What is claimed is:

1. An ambiance lighting system for a vehicular passenger compartment having a variable color of light output responsive to temperature changes within the passenger compartment, said system comprising:
   a plenum for conducting air;
   an air discharge vent operatively connected to said plenum for directing air from said plenum into the passenger compartment;
   a detector for sensing the temperature of air in said plenum;
   a lighting device disposed in said plenum adjacent said vent for projecting light through said vent into the passenger compartment;
   and a control circuit responsive to said detector for energizing said lighting device to project a first color of light when the air temperature is below a predetermined value and for energizing said lighting device to project a second color of light when the air temperature is above a predetermined value, wherein said first and second colors are different and the ambiance within the passenger compartment is enhanced by radiating different colors of light from said plenum, through said vent and into the passenger compartment in response to changes in the sensed temperature of air delivered to said vent so that both the air and the light simultaneously flow in the same direction through said vent.

2. The system as set forth in claim 1 wherein said detector is disposed in said plenum.

3. The system as set forth in claim 1 wherein said lighting device includes a first light source associated with said first color and a second light source associated with said second color.

4. The system as set forth in claim 3 wherein said first light color has a predominant wavelength below 5,500 angstroms and said second light color has a predominant wavelength above 5,500 angstroms.

5. The system as set forth in claim 3 wherein at least one of said first and second light sources includes a light emitting diode.

6. The system as set forth in claim 3 wherein said detector includes a first sensor associated with said first light source and a second sensor associated with said second light source.

7. A method for ambiance lighting a passenger compartment in a motor vehicle, said method comprising the steps of:
   providing a plurality of air plenum, each plenum terminating in a respective downstream vent within a passenger compartment;
   selectively discharging air through the plenum to one active vent within the passenger compartment while preventing the discharge of air through another plenum leading to a dormant vent;
   sensing the temperature of the air;
   and automatically radiating a first color of light from the plenum through the active vent into the passenger compartment when the sensed air temperature is below a predetermined value while not intentionally illuminating the dormant vent, and automatically radiating a second color of light from the plenum through the active vent into the passenger compartment when the sensed air temperature is above a predetermined value, while not intentionally illuminating the dormant vent, wherein the first and second colors are different and the ambiance with the passenger compartment is enhanced by the changing of colors in response to the sensed temperature of air and the colors are radiated only through an active vent while a dormant vent is not illuminated and is further enhanced by simultaneously flowing the light and air through the active vent in the same direction.

8. The method as set forth in claim 7 wherein said sensing step precedes said discharging step.

9. The method as set forth in claim 7 wherein said projecting steps include selectively energizing a first light source operatively associated with the first color and a second light source operatively associated with the second color.

10. The method as set forth in claim 9 wherein said sensing step includes monitoring a first sensor operatively associated with the first light source and monitoring a second sensor operatively associated with the second light source.

* * * * *